(12) United States Patent
McFall et al.

(10) Patent No.: US 12,072,220 B2
(45) Date of Patent: Aug. 27, 2024

(54) ACOUSTIC CAMERA SYSTEMS AND METHODS FOR LARGE SCALE FLOW ANALYSIS IN TURBID FIELD ENVIRONMENTS

(71) Applicant: United States of America as Represented by The Secretary of The Army, Alexandria, VA (US)

(72) Inventors: Brian C McFall, Vicksburg, MS (US); David L Young, Kill Devil Hills, NC (US); Duncan B Bryant, Vicksburg, MS (US); Timothy L Welp, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 1013 days.

(21) Appl. No.: 16/242,882

(22) Filed: Jan. 8, 2019

(65) Prior Publication Data
US 2020/0217702 A1 Jul. 9, 2020

(51) Int. Cl.
*G01F 1/66* (2022.01)
*G01F 1/002* (2022.01)
*G06F 3/147* (2006.01)

(52) U.S. Cl.
CPC .............. *G01F 1/662* (2013.01); *G01F 1/002* (2013.01); *G06F 3/147* (2013.01)

(58) Field of Classification Search
CPC .......... G01F 1/662; G01F 1/002; G06F 3/147
USPC ............................................................ 367/89
See application file for complete search history.

(56) References Cited

U.S. PATENT DOCUMENTS

| | | | |
|---|---|---|---|
| 8,397,573 B2 * | 3/2013 | Kobayashi | G01N 21/1702 359/305 |
| 8,544,342 B1 * | 10/2013 | Feller | G01F 1/3282 73/861.24 |
| 8,638,362 B1 * | 1/2014 | Thompson | G01S 15/89 348/81 |
| 2008/0015440 A1 * | 1/2008 | Shandas | A61B 8/13 600/458 |
| 2011/0023623 A1 * | 2/2011 | Berberig | G01F 1/667 73/861.25 |
| 2013/0345994 A1 * | 12/2013 | Wiklund | G01F 1/704 702/46 |
| 2014/0147013 A1 * | 5/2014 | Shandas | A61B 8/481 382/107 |
| 2018/0253854 A1 * | 9/2018 | Falahatpisheh | A61B 8/488 |
| 2019/0101663 A1 * | 4/2019 | Walters | G01V 1/52 |

* cited by examiner

*Primary Examiner* — Nathaniel T Woodward
(74) *Attorney, Agent, or Firm* — Brian C. Jones

(57) ABSTRACT

In one embodiment, a field-deployable acoustic camera system is provided for measuring a two-dimensional velocity field in a large scale flow in a turbid environment. The system includes an acoustic camera and a concentrator lens. The concentrator lens operates to reduce a spreading angle of the acoustic camera. The system is configured to apply planar cross-correlation velocimetry to collected images of native micro-bubble and/or suspended particle motion collected in turbid environments such as lake circulation, riverine, estuarine, and coastal flows, as well as turbid flows that occur near dredging operations.

20 Claims, 5 Drawing Sheets

ACOUSTIC CAMERA SYSTEMS AND METHODS FOR LARGE SCALE FLOW ANALYSIS IN TURBID FIELD ENVIRONMENTS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to environmental monitoring techniques, and, more particularly but not exclusively, to the use of field-deployable acoustic camera systems and methods for analyzing turbid flows, for example near dredging operations.

Description of the Related Art

This section introduces aspects that may help facilitate a better understanding of the invention. Accordingly, the statements of this section are to be read in this light and are not to be understood as admissions about what is prior art or what is not prior art.

Currently available techniques for measuring a plane of two-dimensional flow velocities in a highly turbid environment suffer from significant limitations. Optical camera-based measurement techniques used to obtain 2D velocity flow fields, such as particle image velocimetry (PIV), are ineffective in turbid environments due to the lack of fluid transparency. Existing acoustic-based techniques that are able to measure velocities in turbid flows are restricted to single point (acoustic Doppler velocimeters) or 1D profile (acoustic Doppler current profilers) velocity measurement. And although certain solutions have been proposed for measuring flow in medical applications, such techniques are not well suited for measuring flow in large scale field environments, such as near dredging operations.

Many natural flows are turbid, such as lake circulation as well as riverine, estuarine, and coastal flows, which frequently contain high suspended sediment concentrations. Turbid flows also occur near dredging operations, where the bed of an area of water, such as a harbor, river, or a shallow lake or ocean area, is cleaned or cleared with a dredge mechanism. Despite the ubiquity of turbid flows, modern flow measurements lack the capability to acquire velocity vector fields in highly turbid flows. Measurements of the velocity field are required to compute spatial gradients of the velocity and other related characteristics such as the strain rate and vorticity, which are important features for describing more complex flows.

Traditional particle image velocimetry (PIV) measurement techniques are not well suited to deploy in the field because they are equipment intensive, require stationary well-calibrated images, and often can only be performed in a reasonably transparent fluid (such that the optical camera can see the tracer particles). Such requirements quickly become restrictive in field deployments, for example in highly turbid environments near dredging operations.

Other acoustic flow measurement devices have been proposed for a variety of applications. Many of these make use of acoustic Doppler velocimetry to measure flow velocity. Acoustic Doppler velocimetry is a distinct means of extracting velocity information; and relies on the change in frequency (Doppler shift) between the outgoing and returning acoustic signal to infer the velocity.

Some measurement techniques have been proposed for analyzing flow within small anatomical spaces, such as in the heart ventricles. Such approaches involve medical ultrasound which typically includes the use of digital transducers for acoustic beamforming. When combined with their high operating frequency, this dramatically limits the scale of the flows such devices are able to adequately image. And while such techniques may be appropriate for small (mm)-scale medical scenarios, they are not appropriate for large (m)-scale applications such as analyzing flow near dredging operations.

SUMMARY

The present invention was developed to address the challenges associated with existing environmental monitoring techniques, for example as described in the above Background section of this application. Research and development has led to a novel approach for analyzing flow in turbid environments. Embodiments of the present invention encompass the use of systems and methods for performing particle-tracking-based flow measurement using an acoustic camera to obtain velocity vector fields in turbid flows. Large scale turbid flows may occur in lake circulation as well as riverine, estuarine, and coastal flows, which frequently contain high suspended sediment concentrations. Turbid flows also occur near dredging operations, where the bed of an area of water, such as a harbor, river, or a shallow lake or ocean area, is cleaned or cleared with a dredge mechanism.

The present invention advances the science of flow analysis. This disclosure describes a new acoustic camera apparatus intended to replace currently known acoustic-based and optic-based measurement techniques. Particular focus will be placed on the ability of the acoustic camera apparatus and the use of acoustic imaging techniques for analyzing large scale turbid flows. The methods presented here are shown to be more efficient and effective than prior methodologies. In some cases, the equipment and techniques disclosed herein relate to bubble image velocimetry (BIV) using images acquired from an acoustic camera.

Embodiments of the present invention encompass systems and methods for acquiring images and performing analysis for planar measurements with an acoustic camera. Acoustic cameras, or imaging sonars, are small multi-beam active sonars that transmit sound pulses into the region of interest and use the returning sound to reconstruct a digital image. The use of an acoustic camera can address the turbid water issue and can at least partially address the extensive equipment requirements that have proven problematic for field deployment of PIV-style measurement techniques.

Particle image velocimetry (PIV) is a flow measurement technique that can be used to acquire 2D and 3D velocity vector fields, making it possible to quantify spatial gradients in the velocity and related flow metrics (i.e., strain rate and vorticity). PIV techniques can be used to measure flows in turbulent boundary layers, measure turbulent pipe flow, quantify flows in microfluidic devices, monitor landslide velocity to study landslide-generated tsunamis, and quantify flows around biological organisms.

Certain challenges are involved when using PIV-style measurement techniques in the field, as such techniques may require the use of specially-designed apparatuses, for example because PIV with an optical camera is equipment intensive (laser and corresponding optics, camera, image calibration equipment, and the like.), requires well-calibrated images, and can only be performed in a relatively transparent fluid. These requirements quickly become restrictive in field deployments, particularly fluid transparency. Many flows in nature are turbid, such as lake circulation, riverine, estuarine, and coastal flows. Existing acoustic-based flow measurement techniques are capable of making velocity measurements in turbid flows (e.g., acoustic Doppler velocimeters—ADVs—and acoustic Doppler current profilers) but are not able to measure the velocity field in a 2D plane as required to compute spatial velocity gradients and vorticity.

Acoustic cameras (ACs or "imaging sonars") were used to acquire the images necessary for PIV-style measurement of the flow in the wake of a circular cylinder. Acoustic camera embodiments disclosed herein can easily operate in turbid environments with low optical clarity. Additionally, acoustic camera embodiments disclosed herein can perform the primary functions of both the illumination source and the camera in a traditional PIV/BIV system, by both emitting and receiving acoustic waves. This significantly lessens the size and power requirements that have proven prohibitive to performing PIV/BIV in the field. Finally, acoustic camera images do not require extensive calibration to convert pixel space to physical space, as required with optical camera images. That information can be directly gleaned from the acoustic waves transmitted and received by the acoustic camera. Rather than traditional seeding particles, the return from micro-bubbles present in the flow can be used as tracers for PIV analysis, referred to as Bubble Image Velocimetry (BIV).

The flow in the wake downstream of a circular cylinder was viewed with the AC and measured with cross-stream arrays of ADVs for two flowrates. The AC movies of the micro-bubble motion in the wake were filtered and written out to images to be used in PIV-style analysis. The AC BIV measurements for the lower of the two flowrates match the ADV cross-stream transect measurements well, both of the mean and fluctuating velocities. An important factor for determining the efficacy of the AC BIV measurements is the size distribution of the bubbles present in the flow, as revealed by the comparative inaccuracies in the higher flowrate AC BIV measurements and the substantially greater number of bubbles larger than 15 μm present during the higher flowrate experiment.

Acoustic cameras are multi-beam active sonars that transmit sound pulses into the region of interest and use the returning sound to reconstruct a digital image. The range to the object(s) scattering the emitted acoustic waves or sound can be determined by the time elapsed between the emission of the acoustic wave and the return of the sound scattered by the object or by the travel time of the acoustic wave. The direction to the scattering object(s) relative to the camera position can be determined by "beamforming" (or "spatial filtering")—using the observed lag between adjacent transducers observing or detecting a sound (i.e. the same sound) returning to the transducer array, for example to estimate the direction. The frequency of the sound pulses emitted by the AC can partially dictate the operating range and resolution of the reconstructed image. In general, lower-frequency sound waves can penetrate farther into the water column relative to higher-frequency sound waves, at the expense of spatial resolution.

Acoustic camera technology can be used as a sensor on underwater vehicles, and can be relied upon even in relatively turbid environments. Acoustic cameras can also be used to monitor fish motion and behavior in a variety of situations, such as in fish-passages at hydropower facilities, under thick ice sheets, and in the vicinity of fishing gears such as pots or surface trawls. Embodiments of the present invention encompass the use of acoustic camera technology to detect or monitor environments or flows that contain a high number of very small particles or bubbles.

The properties of acoustic waves can make it difficult to perform PIV with traditional seeding particles using an AC. The size of the particles necessary to ensure a sufficiently low Stokes number for faithful fluid-following tracers ensures that they fall in the Rayleigh scattering (scattering intensity $\propto d^4$, where d is the particle diameter) or Mie scattering regime for acoustic waves, rather than the regime in which the laws of geometric optics apply (scattering intensity $\propto d^2$) as is often the case for laser light. This is due to the long wavelength of acoustic waves relative to the wavelengths of visible light. As a result, particles on the order of 30 μm are difficult to detect with acoustic measurement devices; this is also what makes acoustic measurement techniques effective in turbid water.

Several properties of bubbles make them attractive alternatives to traditional tracer particles when observing them with an AC. Bubbles have a low acoustic impedance—3500 times lower than that of water. The acoustic impedance is a property analogous to refractive index for light scattering, and it is desirable for the acoustic impedance of the tracers to be as disparate to that of the fluid as possible. Furthermore, the common operating frequencies of ACs are in a similar range to the acoustic resonance frequencies of small micro-bubbles, for example, 1-3 MHz for 3-1 μm bubbles, improving their scattering intensity. As a result, returns from bubbles are highly visible in AC images, making bubble tracers a good fit for flow measurements with ACs.

When using micro-bubbles as tracer particles, there can be a large density difference between air and water. One criterion for particles that faithfully follow the fluid motion is that they be as small as reasonably possible and as close to the density of the fluid as possible. This does not necessarily disqualify the use of air bubbles as tracer particles. Liquid droplets can be used in PIV experiments of gaseous flows despite the large density difference. However, the air bubbles should be much smaller than density-matched particles to serve as adequate tracers. Embodiments disclosed herein were designed to measure a flow with minimal vertical variation in a horizontal plane to mitigate the deleterious effects of buoyancy on the AC measurements.

When imaging bubble motion with an acoustic device an additional phenomenon, called "acoustic speckle" can be taken into account. Acoustic speckle can occur in flows that contain a large volume of scatterers with size on the order of the scale of the acoustic wavelength. If many of these scatterers (micro-bubbles) are present within a single AC bin, the observed intensity within the bin can be due to constructive interference among the micro-bubbles in the bin resulting from the "random phase nature of scattering" from multiple micro-bubbles. Correspondingly, the observed intensity may not represent the return from an individual bubble. Because of this, acoustic speckle may not necessarily represent noise in the data but rather may be the result of ensemble scattering characteristics. As a result, it is still possible to estimate displacements from acoustic speckle even if individual scatterers are not identifiable, provided the displacements and flow gradients are sufficiently small. Note that speckle is not confined to acoustic images and can be observed in high-resolution laser light images as well.

According to some embodiments of the present invention, exemplary techniques include the 2D measurement capabilities of a planar cross-correlation velocimetry approach with a turbidity-penetrating capability of an acoustic measurement device. In some embodiments, planar cross-correlation velocimetry is applied to images of native air micro-bubble and suspended particle motion collected with a field-deployable acoustic camera. The acoustic camera was equipped with a 1° concentrator lens to create a thin insonified volume of imaged small particles and micro-bubbles—thereby mimicking a thin measurement plane. The images were then processed with a cross-correlation-based algorithm to measure the two-dimensional flow velocity field.

Acoustic cameras are imaging sonars that provide clear imagery in highly turbid field environments where optical cameras fail. According to some embodiments of the present invention, an acoustic camera is used that forms the acoustic beams solely with acoustic lenses, a significant distinction over the ultrasound imaging devices common in the medical field. The advantage of beamforming with acoustic lenses, rather than the digital transducers used in small field-of-view medical ultrasounds, is that the acoustic lens beamforming is applied to both the transmitted and received signals. This lowers the effective "side lobes" of each individual beam, resulting in better resolution and a higher dynamic range in the acoustic camera images. Furthermore, the acoustic lens approach is more appropriate and effective when imaging larger areas (e.g., 2 m×2 m). Additionally, medical ultrasound systems operate at much higher frequencies than field-deployable acoustic cameras, allowing for much higher resolution over small spatial scales (e.g., mm), but drastically limiting the range of the instrument and thus the scale of the flows measured. Finally, medical ultrasound often employs a contrast agent to deliberately seed the flow (e.g., blood) with scattering particles/bubbles, such as SonoVue 1-10 μm sulfar hexafluoride micro-bubbles. Some embodiments of the present invention do not involve seeding the analyzed flow with any bubbles/particles; rather, the techniques can be applied on the micro-bubbles native to the measured flow field.

Hence, embodiments of the present invention encompass techniques that make use of cross-correlation velocimetry to measure flow velocity, and provide a means for extracting velocity information that involves observing and correlating particle/bubble motion from image to image (cross-correlation velocimetry). Advantageously, embodiments of the present invention can be used to effectively obtain two-dimensional velocities in large-scale turbid flows. Moreover, embodiments of the present invention encompass the use of an acoustic imaging device that accomplishes 100% of the beamforming using acoustic lenses to measure a two-dimensional flow field.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
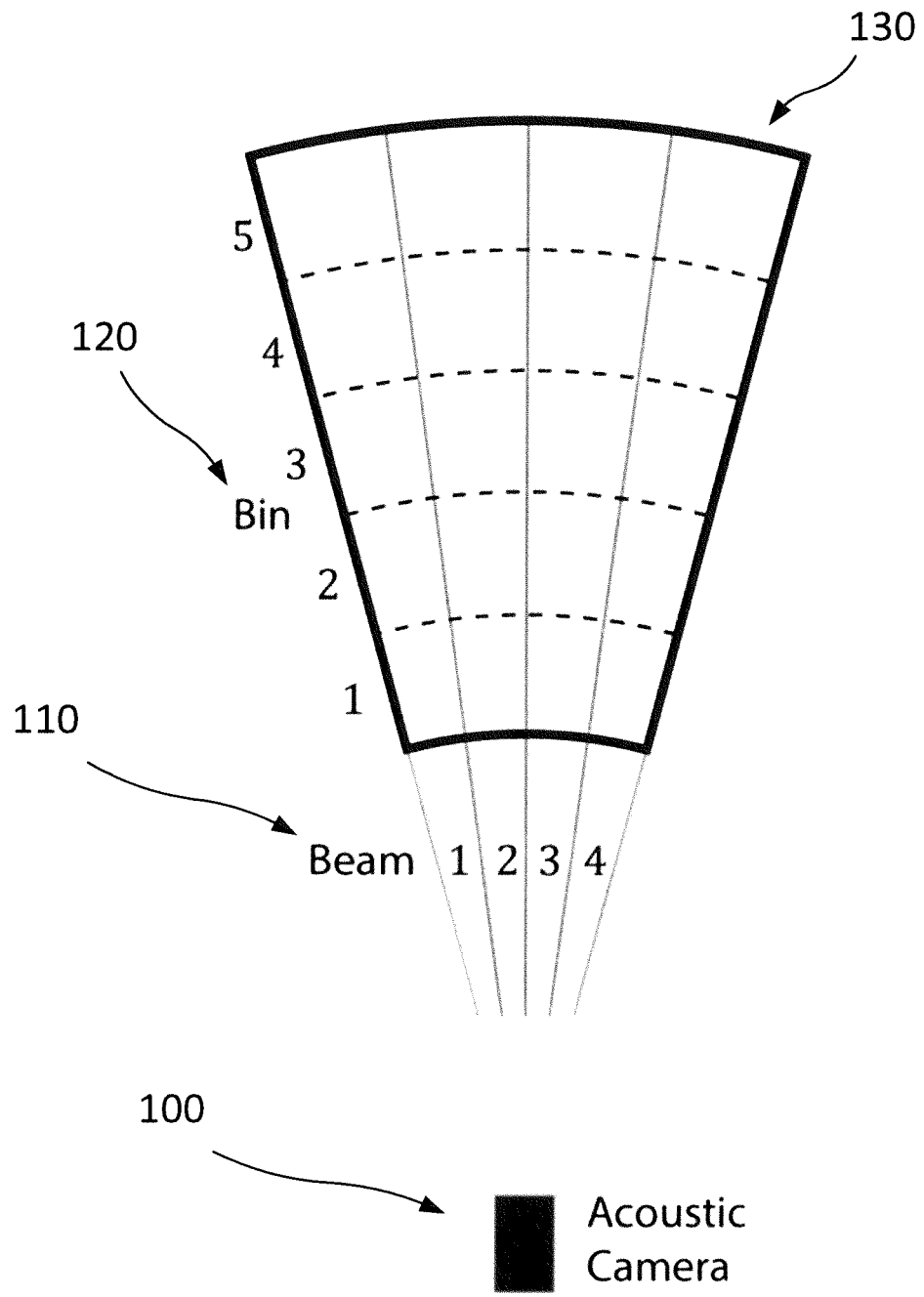
FIG. 1 depicts aspects of an acoustic camera system according to certain embodiments of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In at least one embodiment, the present invention aims to address the shortcoming of currently known flow velocimetry devices by providing a field-deployable acoustic camera equipped with a concentrator lens that can be used in evaluating flow in turbid environments.

Embodiments of the present invention encompass systems and methods for performing bubble image velocimetry (BIV) analysis on images acquired from an acoustic camera (AC) to obtain flow measurements. For example, such techniques were used to obtain measurements of the flow in the wake of a circular cylinder at two flowrates. The acoustic camera can observe the returns from air micro-bubbles suspended in the flow which are used as tracer particles in PIV-style analysis. The size distribution of the micro-bubbles can be measured with an acoustic bubble spectrometer (ABS). It was observed that the AC BIV measurements of the wake agree well with the comparison measurements made by cross-stream arrays of acoustic Doppler velocimeters (ADVs) for the lower of the two measured flowrates. The AC BIV measurements of cross-stream profiles of the mean downstream velocities and the profiles of characteristics of the velocity fluctuations, such as the standard deviation of the downstream and cross-stream velocity fluctuations, the covariance of the horizontal velocity fluctuations, and the kinetic energy of the horizontal velocity fluctuations, all matched the ADV measurements well. The measurement technique can be sensitive to bubble size distribution. It was observed that the higher flowrate AC BIV measurements can vary from the ADV measurements, particularly the measurements of the velocity fluctuations. The higher flowrate experiment was revealed to have an order of magnitude more bubbles with size exceeding 15 μm present in the flow than the lower flowrate experiment. The increased bubble density caused increased noise in the AC images and a "flickering" effect, with bubbles further away from the camera being intermittently obscured by those closer to the camera. The ability to make PIy-style measurements with an acoustic camera has ramifications for flow measurements in the field. ACs operate in turbid environments, do not require a laser and extensive optics, and do not require calibration with a grid plate to convert pixel space to physical space.

The raw data collected by the AC includes the intensity of the returned sound at a series of bins within each beam of the AC, equidistantly spaced from the camera blanking distance to the specified maximum range of the camera. The camera can be equipped with several beams, each set at a slightly different angle, such that they collectively span the full width of the in-plane camera viewing window, as shown in FIG. 1 for an exemplary camera 100 with 4 beams 110 and 5 bins 120 per beam in the measurement volume 130. Due to this configuration the raw AC data are in cylindrical coordinates and the resolution decreases linearly with distance away from the camera. Using simple trigonometry, the angle of each individual beam relative to the camera axis, and the distance from the AC to the sample bin, it is possible to reconstruct a Cartesian image from the cylindrical coordinate data.

Figure 2A:
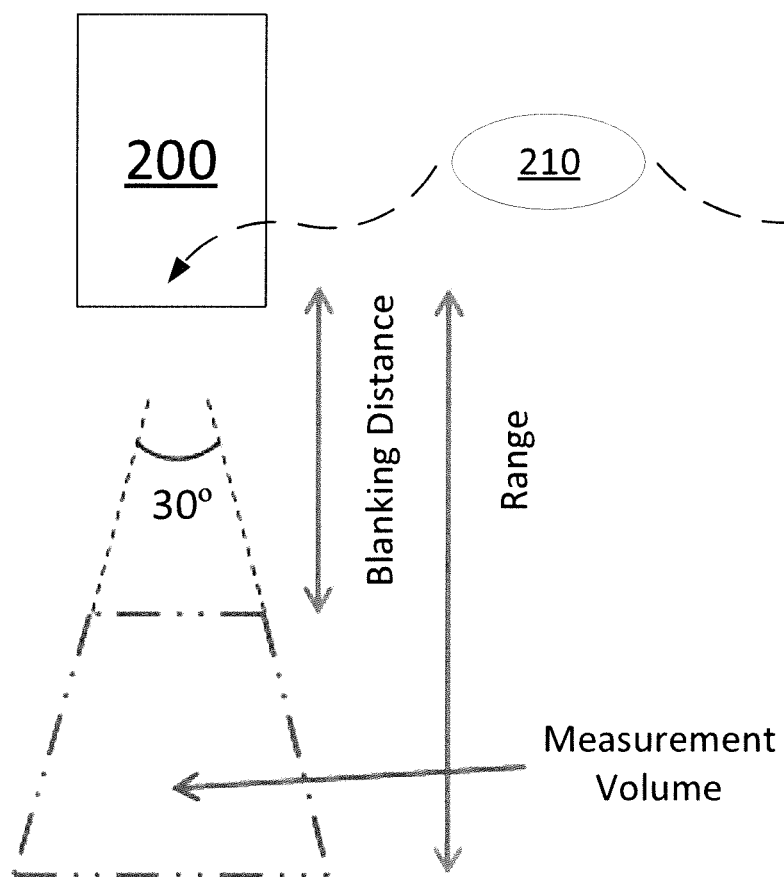
FIGS. 2A and 2B illustrate aspects of an acoustic camera system according to certain embodiments of the invention.
Figure 2B:
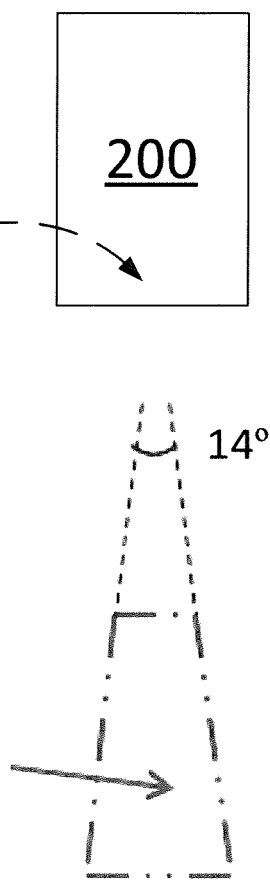
Figure 3:
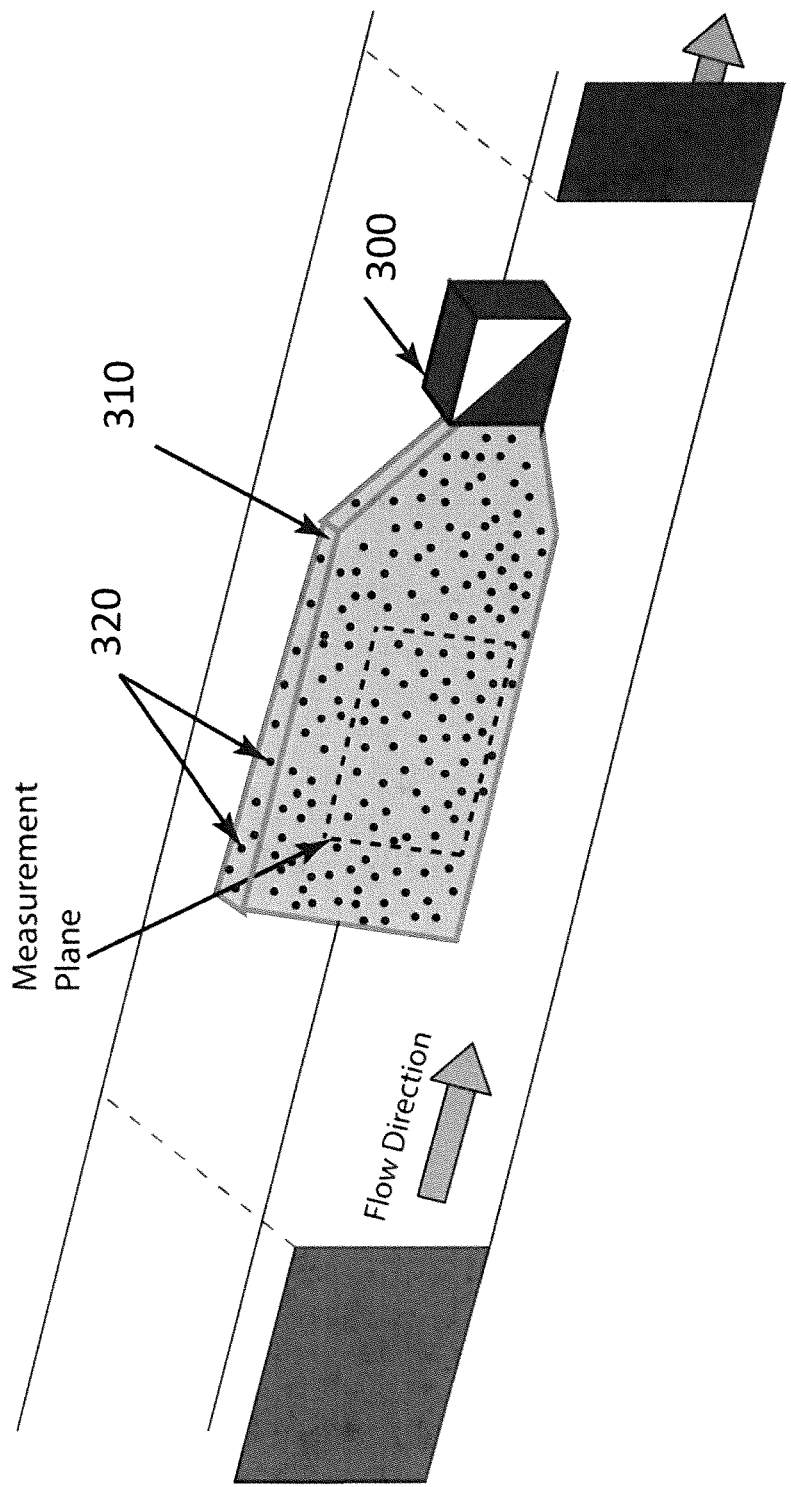
FIG. 3 illustrates features of an acoustic camera system according to certain embodiments of the invention.

FIG. 2A (plan view) and FIG. 2B (side view) depict aspects of an exemplary acoustic camera 200, according to embodiments of the present invention. As shown here, the acoustic camera 200 has a field of view of 30°×14°. According to some embodiments, the 14° spreading angle of the acoustic camera can be reduced to 1°, 3°, 8°, or another desired angle, using an appropriate concentrator lens 210, without altering the frequency of the camera. In some case, assuming the minimum recommended blanked distance and shortest range, the thickness of the insonified volume for an acoustic camera equipped with a 1° concentrator lens can range from 2 cm to 4 cm. For example, as shown in FIG. 3, the acoustic camera system 300 includes an acoustic camera and a concentrator lens. The thickness of the narrow insonified volume 310 can have a value within a range from 1 cm to 5 cm, or other desired narrow planar thickness. As shown here, the acoustic camera system can operate to image micro-bubbles 320 (or small particles such as tracer particles) that are present within the insonified volume 310. An added benefit of using a concentrator lens is that it focuses the acoustic energy into a narrower volume, increasing the resolution of the images.

According to some embodiments, an acoustic camera system can include an acoustic camera such as a Sound Metrics ARIS 3000 Explorer Imaging Sonar (Sound Metrics Corp., Bellevue, Wash.), with an operating frequency of 3 MHz. This camera possesses 128 beams (sound emitting and receiving transducers), each emitted at a slightly different angle such that collectively they span the entire width of the camera viewing window (30° in-plane spreading angle). Each beam measures the intensity of the returned sound at a series of 600 bins, equidistantly spaced from the camera blanking distance (70 cm from the camera) to the specified maximum range of the camera (284 cm in this case). The bin areas over the AC viewing window ranged from 7.5 mm$^2$ to 30.3 mm$^2$, with an average bin area of 18.3 mm$^2$. According to some embodiments, the user-set minimum and maximum camera ranges were 124 and 284 cm, respectively.

According to some embodiments, the acoustic camera system can include a concentrator lens. For example, an acoustic camera can be equipped with a 1° concentrator lens, which reduces the out-of-plane spreading angle of the acoustic camera to 1° (from a standard spreading angle of 14°) without altering the operating frequency of the camera. This focuses the acoustic energy into a narrower volume, increasing the resolution of the images, allowing smaller particles/bubbles to be observed, and forcing the insonified volume to better mimic a thin plane, which can facilitate planar analysis techniques. The thickness of the insonified volume in this study ranged from ≈1.1-2.5 cm—substantially larger than the 1 mm thick laser sheets typical in traditional optical PIV, but sufficiently thin to measure flows that lack substantial variability in the out-of-plane direction. The maximum obtainable framerate of the Sound Metrics acoustic camera was 15 fps. It was observed that the out-of-plane concentrator lens was particularly helpful in facilitating planar analysis techniques. In some cases, if the out-of-plane spreading angle cannot be restricted then the camera may be unsuitable for the intended analysis. It was also observed that cameras with higher operating frequencies can result in higher resolution images at the cost of reduced maximum range. Further, it was observed that cameras with a larger number of beams and bins can return higher resolution images, assuming the in-plane spreading angles are similar.

Embodiments of the present invention encompass the use of any of a variety of concentrator lenses, which may also be referred to as acoustic lenses. Typically, acoustic lenses allow for both the transmission of and reception of narrow beams. Such lenses require no power, and operate at the speed of sound. Acoustic lenses may be constructed of materials such as plastic, epoxy, rubber, liquid, and the like. Acoustic lenses operate to refract sound, similar to the way optic lenses are used to refract light.

In one example according to embodiments of the present invention, the flow measured was the canonical velocity field in the wake of a circular cylinder. Acoustic camera images were collected of the flow in the wake of the cylinder for five minutes at the maximum framerate of 15 fps for each flowrate, resulting in 4500 total images in each dataset. The images were collected with Sound Metrics software used to control the camera (Ariscope) and saved as a proprietary filetype (.aris). An image of the flow output from the software accompanying the acoustic camera depicted microbubbles suspended in the flow that are visible to the acoustic camera. The frames of the ACs were filtered in Ariscope with a proprietary cross-talk reduction algorithm and the allowable decibel range was restricted (e.g. 15.2 dB to 39.2 dB). The cross-talk reduction algorithm accounts for the fact that within an individual AC "frame," the beams fire in a staggered series rather than simultaneously. Specifically, each ARIS Explorer 300 image is made up of 8 ping cycles, each cycle consisting of 16 active beams. Assuming the 128 beams are numbered 0-127, with 0 as the rightmost beam in the camera image, then the ping cycles are as follows: first cycle: beams 0, 8, 16, . . . , 104, 112, 120; second cycle: beams 1, 9, 17, . . . , 105, 113, 121; . . . ; eighth cycle: beams 7, 15, 23, . . . , 111, 119, 127. For 15 fps movies, the maximum temporal offset between beams within a single frame is 0.0583 seconds, between beams 0 and 7, 8 and 15, and so on. The cross-talk reduction reduces erroneous returns when scattered sound from a firing beam is returned to an adjacent, silent beam. Restricting the decibel range filters out minor background noise and intensifies the "brightness" of the tracer bubbles. The filtered Cartesian images are written out to .bmp images for PIV analysis with a "resolution" of 1.85 mm/pixel—deliberately oversampling the raw AC data.

The PIV analysis of the AC images was performed in DaVis (LaVision). Velocity data on the un-calibrated, pixel-space images was generated via cross-correlation with a final window size of 32×32 pixels for the lower flowrate (0.038 m$^3$/s) and 48×48 pixels for the higher flowrate (0.076 m$^3$/s). For the lower flowrate, the cross-correlation was performed between image pairs generated with every third frame. For the higher flowrate the image pairs were of every other frame. The maximum pixel displacements observed between paired frames were 17.8 pixels (low flowrate) and 67.6 pixels (high flowrate). The pixel space positions and velocities were converted to physical space in Matlab (Mathworks, Inc.) using the information from the AC.

The tracer "particles" used in the PIV-style analysis are the micro-bubbles present in the flow due to air entrainment as the water enters the head tank and passes through the flow straightener at the upstream end of the flume. No attempt was made to control the number of bubbles or bubble size, beyond modulating the flowrate in the flume. However, the number and size distribution of the bubbles in the flow are important to the success of BIV analysis and they were measured during the experiments with a Dynaflow Acoustic Bubble Spectrometer (ABS—Dynaflow, Inc.), located ~1 m downstream of the acoustic camera. The ABS determines bubble population by making acoustic measurements at several frequencies using a pair of hydrophones. The bubble population is then determined by the solution to two Fredholm Integral Equations of the first kind (Wu et al. 2014). For the single hydrophone pair ABS system used in our study, the frequency range was 30-250 kHz and able to detect bubbles with diameters between 15-110 μm with a bin resolution of 3.5 μm.

The experimental setup was designed to mimic flow past a circular cylinder in an infinitely wide channel; however, as gleaned from the mean downstream velocity (V) comparisons, the cylinder is sufficiently large (and the flume sufficiently narrow) such that the cylinder noticeably constricts the channel cross-section, resulting in velocities to either side of the cylinder wake that are larger than the estimated mean velocity in the channel upstream of the cylinder (5 cm/s for the low flowrate case). Note that the downstream (y) and cross-stream (x) positions can be normalized by the cylinder diameter (D), and the velocity estimates can be normalized by the maximum mean downstream velocity observed by the ADV's ($V_{max}$).

It was observed that there was agreement between the AC BIV and ADV measurements of the mean downstream velocity, agreement corroborated by the root-mean-square error (RMSE) between the AC BIV and ADV mean downstream velocity measurements.

The general shapes of the AC BIV cross-sectional profiles of the mean downstream velocity follow the ADV profiles—with a large velocity deficit on the wake centerline increasing to local peaks at the edges of the wake due to the channel constriction by the cylinder, before leveling off close to the expected mean velocity upstream of the cylinder in the free-stream outside the wake. Correspondingly, the differences between the AC BIV and ADV measurements of the maximum mean downstream velocities and the cross-sectionally averaged mean downstream velocities do not exceed ±2 mm/s for any cross-section and the RMSEs of the mean downstream velocity measurements are within 3-4 mm/s for all cross-sections. The most noticeable difference between the AC BIV and the ADV measurements is the velocity deficit observed on the wake centerline behind the cylinder. The ADV's generally report larger velocity deficits on the wake centerline than the AC BIV results (e.g., 4.6 cm/s vs. 4.0 cm/s at y/D=1.7 and 3.1 cm/s vs. 2.7 cm/s at y/D=2.8). This is possibly due to a combination of the comparatively large window size for the AC BIV measurements and the cylindrical coordinate nature of the raw AC data. Given the pseudo-resolution of the Cartesian images, the PIV windows are 5.9×5.9 cm. The ADV point measurements made by the Nortek Vectrinos are made over a substantially smaller area (28.3 mm$^2$). Additionally, the size of the raw AC bins increases towards the cylinder (further away from the camera). Thus, the cross-section nearest to the cylinder with the largest cross-stream velocity gradients (y/D=1.7) is also the one with the largest raw AC bins and the lowest spatial resolution. The discrepancy between the maximum observed mean velocity deficit between the AC BIV and the ADV measurements may be caused by this combination of large BIV window and AC bin size.

Measurements were compared of the standard deviation of the downstream ($\sigma_v$) and cross-stream ($\sigma_u$) velocity fluctuations, respectively, between the AC BIV results and the ADV cross-sections. The shape of the cross-stream profiles of $\sigma_v$ from the AC BIV data generally followed the shape from the ADV data—nearest to the cylinder (y/D=1.7) the standard deviation was small outside the cylinder wake and increased to local peaks to either side of the wake centerline before decreasing to a local minimum on the wake centerline. The shape persisted at y/D=2.8, albeit with reduced amplitude. At y/D=3,9 the local minimum on the wake centerline was replaced by a third local maximum—one on the wake centerline of comparable magnitude to those to either side of it. The RMSEs of the standard deviation of the downstream velocity fluctuations were within 2-3 mm/s for all cross-sections, similar to the RMSEs of mean downstream velocity. However, $\sigma_v$ as measured by the ADV's was highly variable across the cross-sections, with large cross-stream gradients. The AC BIV results captured the shape but underestimate the magnitude of the local peaks—likely due to the same combination of large PIV window and AC bin size that caused the discrepancy with the maximum observed velocity deficit. The shape of the cross-stream profiles of $\sigma_u$ from the AC BIV data followed the shape from the ADV data, i.e., small in the free-stream rising to a peak on the wake centerline. At y/D=1.7, the AC BIV measured $\sigma_u$ was only slightly larger in magnitude on the centerline than the ADV estimated. Moving downstream, the discrepancy in the magnitudes on the centerline became more noticeable at y/D=2.8 and y/D=3.9. This may be suggestive of an omnipresent source of noise in the AC BIV cross-stream velocity fluctuations that was not present in the ADV measurements. When the standard deviation of the cross-stream velocity fluctuations is high, this noise is a smaller component of the total signal, but becomes larger as the "true" au begins to decrease with increasing distance downstream. This noise is likely caused by a combination of: (1) effects from the staggered firing order of the AC beams—which, based on the orientation, would have a larger impact on the cross-stream velocity measurements and (2) the uncertainty in the bubble position within each frame due to the comparatively low resolution bins and acoustic speckle. The RMSEs of the standard deviation of the cross-stream velocity fluctuations are again within 2-3 mm/s for all cross-sections, identical to the range of RMSEs of the standard deviation of the downstream velocity fluctuations.

Turbulence characteristics such as Reynolds stress and turbulent kinetic energy may not be compared without separating out or otherwise removing the fluctuations due to periodic vortex shedding off the cylinder. However, the covariance of the downstream and cross-stream velocity fluctuations ($\overline{u'v'}$) and the horizontal fluctuating kinetic energy (HFKE=$0.5[\overline{u'u'}+\overline{v'v'}]$) can be compared. The cross-stream profiles of $\overline{u'v'}$ from the AC BIV data followed the shapes of the ADV cross-stream profiles, i.e., near-zero in the free-stream, increasing to a local maximum at on the negative x-side of the wake centerline, passing through zero on the wake centerline, then decreasing to a local negative maximum on the positive x-side of the wake centerline before returning to near-zero in the free-stream. As observed with the mean downstream velocity deficit and the standard deviation of the downstream velocity, the AC BIV results did not quite capture the magnitude of the local peaks to either side of the wake centerline observed by the ADVs, again likely due to the large PIV window and AC bin size. The RMSE of $\overline{u'v'}$ between the AC BIV and ADV measurements is largest at the upstream cross-section (0.5 cm$^2$/s$^2$ at y/D=1.7) and decreases with distance downstream (0.3 cm$^2$/s$^2$ and 0.2 cm$^2$/s$^2$ at y/D=2.8 and y/D=3.9, respectively). This follows from the AC BIV measurements underpredicting the magnitudes of the local peaks in $\overline{u'v'}$ relative to the ADV measurements; the local largest local peaks in $\overline{u'v'}$ are found in the cross-section closest to the cylinder.

The cross-stream profile shapes of HFKE were in agreement between the AC BIV results and the ADV transect data, with shapes similar to the $\sigma_u$ cross-stream profiles—small in the free-stream increasing to a maximum on the wake centerline. At y/D=3.9 the AC BIV cross-stream profile shape begins to slightly overestimate the peak HFKE magnitude relative to the ADV estimate. The quality of the agreement may be partially due to the serendipitous interaction of the discrepancies between the AC BIV and ADV measurements of $\sigma_v$ and $\sigma_u$. The AC BIV estimates of $\sigma_v$ were slightly low on the wake centerline, whereas the $\sigma_u$ estimates were consistently slightly higher on the wake centerline. The RMSEs of the HFKE between the AC BIV and ADV measurements are within 0.4-0.5 cm$^2$/s$^2$ for the three cross-sections.

The general quality of the low flowrate AC BIV results was not consistent throughout the measurement plane. In particular, the corners of the measurement plane nearest to the cylinder (and furthest away from the AC) yielded generally poorer results than the rest of the images. This is likely due to shadowing of those regions in the raw AC images. The images outside of these corner regions yield substantially higher-quality results for the low flowrate dataset.

It is desirable to determine if the AC BIV results are able to detect the periodic vortex shedding in the wake of the cylinder. The vorticity ($\omega_z$) non-dimensionalized by the Strouhal number estimated vortex-shedding period ($T_{Sr}$) was measured, along with the velocity vectors the AC BIV from the average of five continuous velocity vector fields. The distinct alternating sign vortices indicate the AC BIV measurements capture the large-scale vortices being shed from the cylinder.

To consider how the observed shedding frequency from the AC BIV measurements compares with that of the ADV's and expected from theory, the power spectral density (PSD) of the downstream velocity fluctuations from the AC BIV measurements and the ADV located at x/D=1.41, y/D=2.82 were observed. The shedding frequency estimated by assuming the Strouhal number=0.2 ($f_{Sr}$=0.065) was plotted.

In both the ADV measurements and the AC BIV results, the PSD of the downstream velocity displayed a peak at the expected shedding frequency ($f_{Sr}$), indicating that both measurement systems were observing the shedding of the large-scale alternating sign vortices from the cylinder. This periodicity was most noticeable at the ADV's (and AC BIV measurements) located at x/D=±1.41 and x/D=±0.94. Note that at higher frequencies (f≥3 Hz) the AC BIV and the ADV PSD's of the downstream velocity noticeably diverge, possibly due to the AC BIV measurement's lower sampling frequency.

The PSDs of the cross-stream velocity also displayed peaks at the expected shedding frequency ($f_{Sr}$) for the AC BIV and the ADV measurements, but the PSD's diverge at a lower frequency (f≥0.3 Hz), with the AC BIV measurements underestimating the energy in this region relative to the ADV. The discrepancy in the PSDs of the cross-stream velocity may be due to a combination of the staggered firing order of the acoustic camera beams and the effects of the cross-talk reduction algorithm redistributing/removing energy from these frequencies. Given the orientation of the acoustic camera this effect would be more pronounced in the PSD of the cross-stream velocity, explaining why it is less noticeable in the downstream velocity PSD.

The results for the high flowrate (0.076 m$^3$/s) experiment data contrasted noticeably with the lower flowrate (0.038 m$^3$/s) results. The AC BIV results for the higher flowrate data can reasonably approximate the "macro"-scale flow characteristics observed by the ADV's, such as the maximum mean downstream velocity observed in each cross-section or the mean downstream velocity averaged across each cross-section. However, the nuanced features of the flow are not captured by the AC BIV measurements at the higher flowrate. Note the discrepancies between the maximum downstream velocity deficits between the AC BIV and the ADV results. Furthermore, it was observed that the mean downstream velocity cross-sections for the high flowrate AC BIV results do not resemble the ADV measured profile shapes as well as for the low flowrate case. The AC BIV measurements for the high flowrate case are also less capable of differentiating between the mean downstream velocity profiles at the three cross-sections, particularly the velocity deficits on the centerline.

The differences between the high flowrate results and the low flowrate results were more striking in the estimates of the velocity fluctuations made by the AC BIV relative to those measured by the ADVs. The standard deviations of the (a) downstream and (b) cross-stream velocity fluctuations for the high flowrate dataset were measured by the AC BIV and ADV transects.

The cross-stream profiles of the standard deviation of the downstream velocity fluctuations ($\sigma_v$) from the AC BIV measurements appeared almost unrelated to those from the ADV measurements. The standard deviations of the cross-stream velocity fluctuations ($\sigma_u$) from the AC BIV measurements did show local peaks on the wake centerline and the standard deviations are larger at the cross-section near the cylinder (y/D=1.7) then decrease with distance downstream, as expected. For both the downstream and the cross-stream, the standard deviations of the velocity fluctuations are substantially larger in the AC BIV measurements relative to the ADV transect measurements. In brief, neither the downstream nor the cross-stream velocity fluctuations were adequately captured from the AC BIV data for the high flowrate case.

A large discrepancy was observed between the accuracy of the low flowrate (0.038 m$^3$/s) and the high flowrate (0.076 m³/s) AC BIV results. The larger PIV window size (48×48 pixels) used in the higher flowrate PIV analysis may partially explain the larger discrepancy in the maximum observed downstream velocity deficit between the AC BIV data and the ADV data for the higher flowrate results, but does not explain the striking difference in the results for the velocity fluctuations. To shed light on this, it may be helpful to consider the bubble size distributions as measured by the ABS system for the low flowrate and high flowrate experiments.

A stark difference in the bubble size distribution present in the flow between the low flowrate and high flowrate experiments was observed. In the size range measurable by the ABS system, the high flowrate data appeared to have nearly an order of magnitude more "large" bubbles—e.g., larger than 15 μm, than the low flowrate data. It is important to note that, although not measurable with the ABS system used in this study, it is reasonable to assume there are a substantial number of bubbles smaller than 15 μm in both the low flowrate and high flowrate experiments. Additionally, based on the radius of the bubbles observed by the ABS system and the size of the AC bins, it is reasonable to further assume that the returns from individual camera bins are more likely to represent the ensemble scattering characteristics of multiple bubbles (acoustic speckle) than an individual bubble.

This drastic difference in the number and size of the bubbles has a noticeable effect on the sequence of images in the AC movies. The images sequences of ensemble bubble returns observed in the low flowrate experiment appear visually similar to those one might expect from traditional optical camera PIV experiments, indicating that the bubble density is sufficiently high for the acoustic speckle displacements to represent meaningful motion of the ensemble of bubble scatterers, yet not so high that the images are overwhelmed. Furthermore, the agreement between the ADV and AC BIV measurements for the low flowrate experiment indicate that the velocities and velocity gradients were sufficiently small for the acoustic speckle motion to serve as an effective surrogate for the flow. In contrast, the drastic increase in the number of "large" bubbles, the increase in magnitude of the velocities, and the corresponding increase in the velocity gradients for the high flowrate case all contraindicate the estimation of flow velocities from acoustic speckle motion. This is borne out in the poor quality of the ADV and AC BIV agreement for the high flowrate case.

The effect this has on the sequence of images in the AC movies is most readily visible in the apparent "flickering" in the high flowrate image sequences. The images from the both the lower and higher flowrate experiments show the ensemble of bubbles sweeping around the cylinder and into the wake, but the signal appears to "flicker" in the high flowrate movies, where the returns in some instances disappear and re-appear rather than progress steadily from frame-to-frame. The increase in the number and size of the bubbles for the high flowrate case likely caused a higher level of noise in the acoustic speckle returns. The bubble size and density for the high-flowrate case may also partially obstruct the view of the AC, creating a shadowing effect where scatterers further from the AC are temporarily obscured by those closer to the AC, then reappear in a subsequent frame once the obstruction abates.

The higher flowrate AC BIV measurements were still able to reasonably estimate the maximum mean downstream velocity and the cross-stream averaged mean downstream velocity, therefore the errors did not appear to have substantial bias upstream or downstream. However, the AC BIV measurements of the velocity fluctuations for the high flowrate data were dramatically impacted and inadequately replicated the results from the ADV cross-sectional transects.

These results demonstrated the ability to successfully measure the flow in the wake of a circular cylinder by performing PIV-style analysis on images collected from an acoustic camera (AC), using the returns from micro-bubbles present in the flow as tracers, referred to as bubble image velocimetry (BIV). The AC BIV measurements were benchmarked against the measurements made by three cross-sectional transects of ADV measurements. The AC BIV measurements compare favorably with the ADV transect measurements, including mean and fluctuating velocity characteristics, for the lower of the two flowrates tested (0.038 m³/s). The discrepancies between the low flowrate AC BIV measurements and the ADV transect measurements, specifically the depressed amplitude of cross-stream variation in the cross-sectional profiles of the mean downstream velocity, standard deviation of the downstream velocity fluctuations, and the covariance of the downstream and cross-stream velocity fluctuations, can be largely explained by the large PIV window size and AC bin size relative to the ADV sampling area.

The AC BIV measurements may be improved with use of a more sophisticated PIV processing routine, e.g., multi-frame PIV and the application of a sweep correction to account for the acoustic camera beams firing in staggered series. Alternatively, the AC images may be processed with particle tracking velocimetry algorithms (rather than PIV) to avoid deleterious effects related to the PIV cross-correlation window size, though the success of this technique relative to PIV may depend on the bubble density and observed bubble displacement.

The successful application of PIV-style analysis to images collected by a field-deployable acoustic camera has implications for flow measurement in turbid field environments. The acoustic camera was able to observe the tracer bubble return and collect images of sufficient quality to perform PIV-style analysis in water too turbid for traditional optical camera PIV over a comparatively large measurement plane (83×66 cm). The AC BIV system did not require a laser, extensive optics, or image calibration with a grid plate as would optical camera PIV. Finally, the AC BIV technique performed admirably using native micro-bubbles as tracers, obviating the need to seed the flow with particles. The combination of these capabilities makes AC BIV an effective solution for two-dimensional velocity vector field measurement of turbid flows frequently encountered in the field.

These results also provided information on the sensitivity of the AC BIV measurements to the bubble size distribution. Where the lower flowrate (0.038 m³/s) AC BIV measurements compared favorably to the ADV transect measurements, the higher flowrate (0.076 m³/s) AC BIV measurements diverged noticeably from the ADV measurements. Upon closer observation of the bubble size distributions for the two flowrates, it was revealed that the high flowrate experiment appeared to have an order of magnitude more bubbles larger than 15 μm present in the flume than the low flowrate experiment. The increased bubble density caused a greater level of noise in the images and a "flickering" effect, with bubbles further away from the camera being intermittently obscured by those closer to the camera. This effect had an impact on the ability of the AC BIV to measure the velocity fluctuations at the higher flowrate.

Additional Comments and Sample Results

Bubbles are highly visible in acoustic-camera images because the acoustic impedance of air is substantially lower than that of water. Consequently, if bubbles are present in the flow in significant quantities and are sufficiently small, they are well suited for analysis. As the number and size distribution of the bubbles in the flow can be important, bubble size and quantity were directly measured with a Dynaflow Acoustic Bubble Spectrometer (ABS—Dynaflow, Inc., Jessup, Md.). The ABS determines the bubble population by making acoustic measurements at several frequencies with a pair (or several pairs) of hydrophones. The bubble population can then be determined by the solution to two Fredholm Integral Equations of the first kind. Acoustic cameras typically involve a completely different viewing position as compared to an optical camera to observe (ostensibly) the same object. Optical cameras are generally placed to observe the image in a position perpendicular to the image plane. In contrast, embodiments of the present invention involve placing the acoustic camera to view along the plane of the image. According to some embodiments, it may be helpful to validate acoustic camera measurements with another measurement technique (e.g. optical PIV, Acoustic Doppler Velocimeters-ADV's, Acoustic Doppler Current Profilers-ADCP's, and the like).

The data from the acoustic camera were filtered in the Soundmetrics image acquisition software (Ariscope) by applying two distinct filters; a restriction of the allowable decibel range and a proprietary cross-talk reduction algorithm. The decibel range filter is performed because the signal from the bubbles visible in the acoustic camera images typically occupies a comparatively narrow band of the full dB range of the camera. For example, based on the signal intensity histogram for the data collection observed, the bubbles are primarily observed in the range 15.2-39.2 dB. To isolate the bubbles, all bins in which the observed intensity is less than the minimum of the allowable intensity range (15.2 dB) are set to zero. Then, all bins in which the observed intensity is greater than the maximum of the allowable intensity range (39.2 dB) are set to the value of the maximum of the intensity range. Finally, the intensity in all of the bins is scaled up such that the maximum intensity observed prior to the filter is the same as the maximum intensity observed after the filter has been applied. The cross-talk reduction algorithm accounts for the fact that within an individual AC "frame," the beams fire in a staggered series rather than simultaneously. The cross-talk reduction reduces erroneous returns when scattered sound from a firing beam is returned to an adjacent, silent beam.

The acoustic camera data is in polar coordinates, thus the sample size of each bin increases linearly with distance away from the camera. For certain data presented here, the minimum and maximum area the bins were 7.5 mm2 and 30.3 mm2, respectively, with an average area of 18.3 mm2. Using simple trigonometry, the angle of each individual beam relative to the camera axis, and the distance from the acoustic camera to the sample bin, it is possible to reconstruct a Cartesian image from the filtered polar coordinate data. As a consequence of the polar-to-Cartesian conversion, the "resolution" of the Cartesian image must be manually specified rather than directly determined by the pixel resolution of the imaging sensor (as would be the case for an image acquired with a digital camera). To ensure adequate Cartesian image reconstruction, each pixel in the Cartesian images used in this study was set to correspond to a 1.5 mm×1.5 mm square, resulting in images that became progressively more oversampled with distance away from the acoustic camera. The filtered Cartesian movies were written to .avi files in Ariscope and Cartesian image from each frame of the AC movies were written to .bmp files by a Matlab (Mathworks, Inc.) script. Two reconstructed Cartesian images were obtained, one without and one with filtering. It was possible to observe the reduction in background noise and a sharpening of the tracer bubbles in the filtered image.

Once the filtered images were written out, the .bmp files were loaded into PIV processing software to obtain velocity vectors. The velocity data presented in this study were obtained via cross-correlation with a window size of 32×32 pixels using the commercially available PIV software DaVis (LaVision, Ypsilanti, Mich.), but alternatives are available (e.g., mpiv in Matlab). To ensure adequate pixel displacement of the tracer bubbles between frames, every third image was used in the PIV processing. A total of 4499 instantaneous velocity vector fields were written out to .dat files for analysis. for each flowrate.

The use of an acoustic camera to conduct bubble image velocimetry (BIV) was examined using the canonical flow past a cylinder. The flow measured was the 2D velocity field parallel to the bed in the wake of the circular cylinder. An experiment was conducted in a 1.98 m wide flume located at US Army Engineer Research and Development Center in Vicksburg, Ms. The flume was 14 m long, and the 18.9 cm diameter cylinder was placed on the flume centerline 10.25 m from the flow straightener at the head of the flume. Notably, there was a mildly sloped section that terminated 190 cm upstream of the cylinder, where the bed drops 6 cm over 117 cm. Additionally, the flume sump is partially located outdoors and as a result the water in the flume was not transparent during the experiment. The flow fields for two flowrates were measured: 0.038 $m^3$/s and 0.076 $m^3$/s. The water depth was constant at 38 cm for both flowrates tested. This corresponds to cross-sectionally averaged velocities of 5 cm/s and 10 cm/s upstream of the cylinder, and cylinder diameter-based Reynolds numbers ($R_D$) of 9400 and 18800, respectively.

Figure 4:
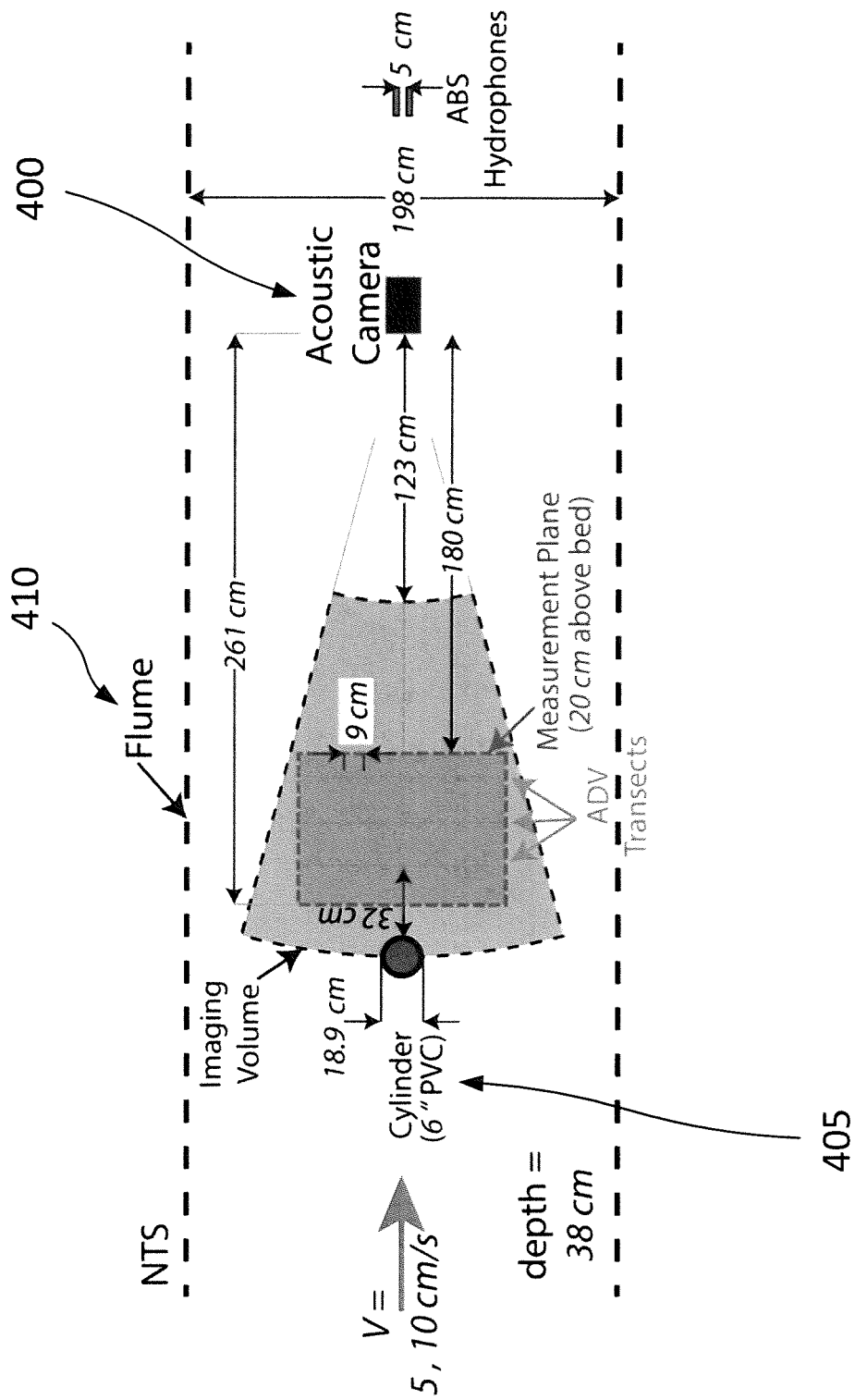
FIG. 4 depicts aspects of an acoustic camera system according to certain embodiments of the present invention.

A diagram of an experimental setup for an acoustic camera system 400 is shown in FIG. 4. The velocity results from the acoustic camera BIV were benchmarked against data collected by Nortek Vectrino ADVs (Nortek) with a manufacturer stated accuracy of ±0.5% of the measured velocity. The ADV comparison measurements (e.g. data collected by ADV's) were made at three distinct cross-sections spaced 20 cm apart in the downstream direction, with the first cross-section located 32 cm downstream of the cylinder 405. Each cross-section consisted of 10 ADV measurements, spaced 9 cm apart in the cross-stream direction. Data was collected by a transect of ADV's at 25 Hz for 5 min at each cross-section. Once the data collection at the upstream cross-section was complete, the ADV transect was moved downstream to the location of the next cross-section and the procedure was repeated. The flow was allowed to return to steady-state for 10 minutes between ADV cross-sections. The use of this technique was primarily driven by the number of ADV's available, but had the added benefit of avoiding flow disturbance due to the presence of upstream ADV's impacting the downstream results. The sampling volume of the ADV's was 20 cm above the bed. The AC BIV measurements occurred prior to the ADV measurements, with the ADV probes not present in the flume 410, to avoid flow disturbance or any cross-talk between the ADV's and the AC. As a result, the ADV measurements were not time-synced with the AC BIV results and subsequent comparisons address only the statistical properties of the flows.

ADV measurements were used to validate the AC BIV results in lieu of optical camera PIV due to the turbidity.

As the ADV and acoustic camera results were not time-synced, statistical flow characteristics were compared, specifically the mean downstream velocity (U) and the standard deviations of the cross-stream and downstream velocities (σv and σu, respectively). Velocities were normalized by the maximum mean velocity observed in the acoustic camera BIV data (Umax) and distances were normalized by the cylinder diameter (D). To determine if the periodic shedding of vortices in the cylinder wake was detected, the power spectral densities (PSD's) of the cross-stream velocity between the ADV and the acoustic camera at x/D=2.82, y/d=−1.14 were compared alongside the shedding frequency estimated by the Strouhal number (St=fSrD/U=0.20). The PSD is an estimate of the energy in the signal (the downstream or cross-stream velocities) at a series of discrete frequencies. The PSDs are plotted on log-log axes.

In these results, the acoustic camera slightly under-measured the magnitude of the cross-stream variability in the mean downstream velocity, but returned the proper profile shape and profile evolution in the wake of the cylinder. Additionally, the acoustic camera slightly over-measured the magnitude of the standard deviation of the cross-stream velocity, yet again the appropriate profile shape and downstream evolution were captured. The acoustic camera did not accurately reproduce the standard deviation of the downstream velocity. The profile shape was distinctly different than that expected in the wake of the cylinder (i.e., greater at the edges rather than at the center). This suggests a zero-mean source of noise at the periphery of the viewing window as the bubbles approach the acoustic camera (i.e., downstream) that is not accounted for in the filtering. Finally, the signal from the vortex shedding was detected in both the ADV and the acoustic camera, with local spikes in both PSD's centered on the estimated vortex shedding frequency (fSr).

This study described in detail the materials and methods necessary to perform BIV using images obtained from an acoustic camera. When compared to measurements made from ADV's, the acoustic camera slightly under- and over-measured the magnitudes of the cross-stream variability in the mean downstream velocities and the cross-stream velocity fluctuations, respectively, but displayed the correct profile shapes.

Figure 5:
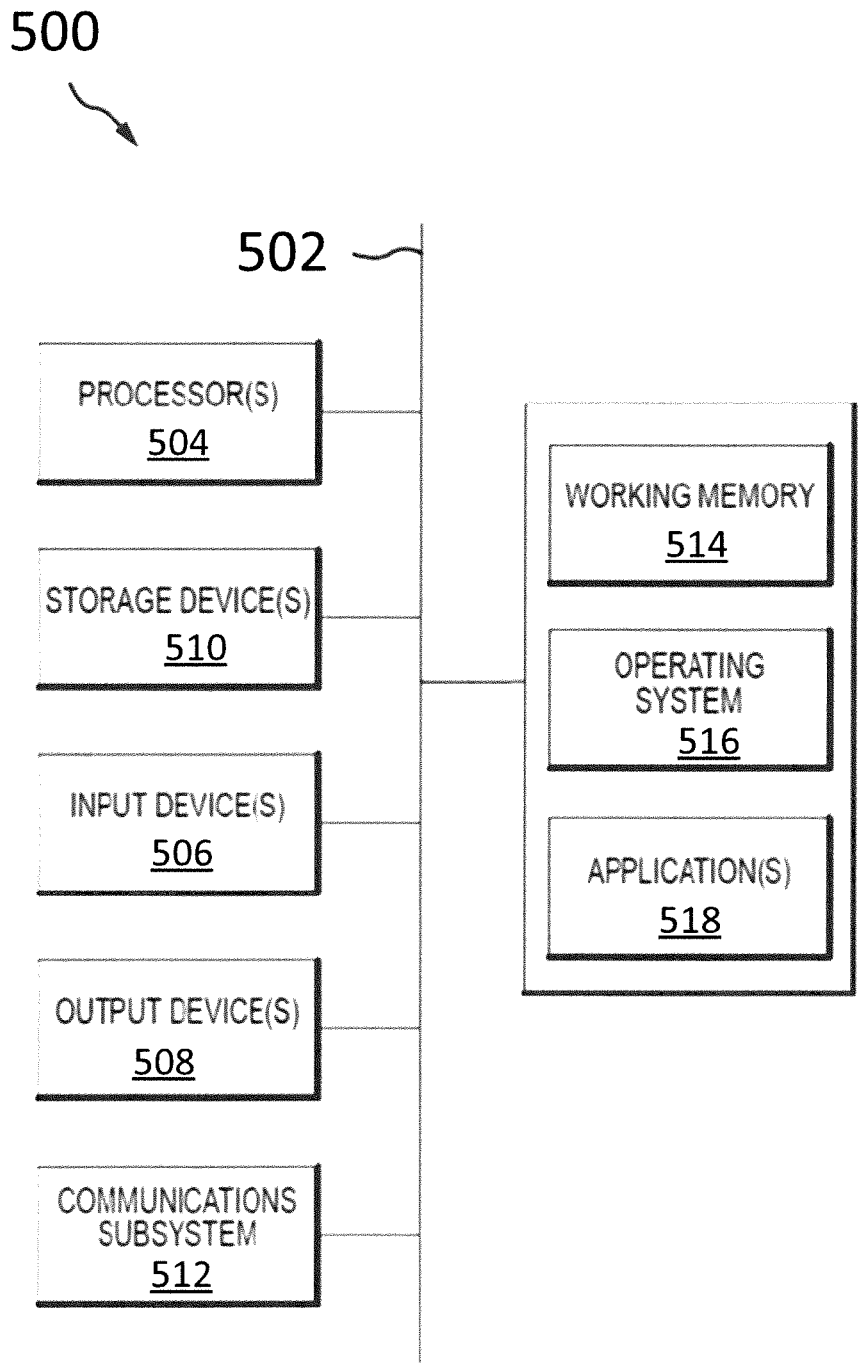
FIG. 5 shows aspects of a computer system for use with an acoustic camera system according to embodiments of the present invention.

FIG. 5 depicts an exemplary computer system or device 500 configured for use with an acoustic camera system and/or a display system according to embodiments of the present invention. An example of a computer system or device 500 may include an enterprise server, blade server, desktop computer, laptop computer, tablet computer, personal data assistant, smartphone, any combination thereof, and/or any other type of machine configured for performing calculations. Any computing devices encompassed by embodiments of the present invention may be wholly or at least partially configured to exhibit features similar to the computer system 500.

The computer device 500 of FIG. 5 is shown comprising hardware elements that may be electrically coupled via a bus 502 (or may otherwise be in communication, as appropriate). The hardware elements may include a processing unit with one or more processors 504, including without limitation one or more general-purpose processors and/or one or more special-purpose processors (such as digital signal processing chips, graphics acceleration processors, and/or the like); one or more input devices 506, which may include without limitation a remote control, a mouse, a keyboard, and/or the like; and one or more output devices 508, which may include without limitation a presentation device (e.g., controller screen), a printer, and/or the like. In some cases, an output device 508 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 500 to a user.

The computer system 500 may further include (and/or be in communication with) one or more non-transitory storage devices 510, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 500 can also include a communications subsystem 512, which may include without limitation a modem, a network card (wireless and/or wired), an infrared communication device, a wireless communication device and/or a chipset such as a Bluetooth device, 802.11 device, WiFi device, WiMax device, cellular communication facilities such as GSM (Global System for Mobile Communications), W-CDMA (Wideband Code Division Multiple Access), LTE (Long Term Evolution), and the like. The communications subsystem 512 may permit data to be exchanged with a network (such as the network described below, to name one example), other computer systems, controllers, and/or any other devices described herein. In many embodiments, the computer system 500 can further comprise a working memory 514, which may include a random access memory and/or a read-only memory device, as described above.

The computer device 500 also can comprise software elements, shown as being currently located within the working memory 514, including an operating system 516, device drivers, executable libraries, and/or other code, such as one or more application programs 518, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 510 described above. In some cases, the storage medium might be incorporated within a computer system, such as computer system 500. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 500 and/or might take the form of source and/or installable code, which, upon compilation and/or installation on the computer system 500 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 500, various computer-readable media might be involved in providing instructions/code to processor(s) 504 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 510. Volatile media may include, without limitation, dynamic memory, such as the working memory 514.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 504 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally can receive signals, and the bus 502 then can carry the signals (and/or the data, instructions, and the like, carried by the signals) to the working memory 514, from which the processor(s) 504 retrieves and executes the instructions. The instructions received by the working memory 514 may optionally be stored on a non-transitory storage device 710 either before or after execution by the processor(s) 504.

It should further be understood that the components of computer device 500 can be distributed across a network. For example, some processing may be performed in one location using a first processor while other processing may be performed by another processor remote from the first processor. Other components of computer system 500 may be similarly distributed. As such, computer device 500 may be interpreted as a distributed computing system that performs processing in multiple locations. In some instances, computer system 500 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

Summary

This application discloses the novel utility of field-deployable acoustic camera systems for analyzing flow in turbid environments. Embodiments of the present invention encompass the use of a field-deployable acoustic camera equipped with an acoustic lens for beamforming. Advantageously, acoustic lens beamforming can be applied to both transmitted and received signals, which lowers the "sidelobes" of individual beams, thus resulting in better resolution and a higher dynamic range in the acoustic camera images. Further, field-deployable acoustic camera system and method embodiments of the present invention operate at relatively low frequencies, as compared to other higher frequency ultrasound devices. Hence the disclosed systems and methods, which combine acoustic lens beamforming technology with lower operating frequencies, therefore have a greater range for imaging larger areas (e.g. 2 m×2 m or greater) and can measure larger flows. Still further, systems and method embodiments disclosed herein can be used to analyze air micro-bubbles native to the measured flow field (e.g. lake circulation), as compared to techniques that measures flow tracers that are seeded into the measured flow.

In one aspect, embodiments of the present invention encompass methods of measuring a two-dimensional velocity field for a large scale flow in a turbid environment with a field-deployable acoustic camera system. Exemplary methods can include positioning the field-deployable acoustic camera system in the turbid environment, where the field-deployable acoustic camera system includes an acoustic camera and a concentrator lens, and the concentrator lens operates to reduce a spreading angle of the acoustic camera. Methods can also include measuring the two-dimensional flow velocity field in the turbid environment with the field-deployable acoustic camera system. In some cases, the field-deployable acoustic camera system measures the two-dimensional flow velocity field by analyzing native micro-bubbles present in the turbid environment. In some cases, the turbid environment is a riverine flow, an estuarine flow, a coastal flow, or a flow near dredging operations. In some cases, the concentrator lens operates to reduce the spreading angle of the acoustic camera to an angle having a value within a range that extends from 1° to 8°. In some cases, the concentrator lens operates to reduce the spreading angle of the acoustic camera to 8°. In some cases, the concentrator lens operates to reduce the spreading angle of the acoustic camera to 3°. In some cases, the concentrator lens operates to reduce the spreading angle of the acoustic camera to 1°. In some cases, the field-deployable acoustic camera system is configured to evaluate an insonified volume having a thickness value within a range that extends from 1 cm to 4 cm.

In another aspect, embodiments of the present invention encompass field-deployable acoustic camera systems for measuring a two-dimensional velocity field in a large scale flow in a turbid environment. Exemplary systems can include an acoustic camera, and a concentrator lens in operative association with the acoustic camera. The concentrator lens can operate to reduce a spreading angle of the acoustic camera. In some cases, the concentrator lens operates to reduce the spreading angle of the acoustic camera to an angle having a value within a range that extends from 1° to 8°. In some cases, the concentrator lens operates to reduce the spreading angle of the acoustic camera to 8°. In some cases, the concentrator lens operates to reduce the spreading angle of the acoustic camera to 3°. In some cases, the concentrator lens operates to reduce the spreading angle of the acoustic camera to 1°. In some cases, the field-deployable acoustic camera system is configured to evaluate an insonified volume having a thickness value within a range that extends from 1 cm to 4 cm.

In still another aspect, embodiments of the present invention encompass computer program products for determining a two-dimensional velocity field in a large scale flow in a turbid environment. Exemplary computer program products can be embodied on a non-transitory tangible computer readable medium, and can include computer-executable code for receiving flow measurement information from an acoustic camera system, where the acoustic camera system includes an acoustic camera and a concentrator lens, and the concentrator lens operates to reduce a spreading angle of the acoustic camera. Exemplary computer program products can also include computer-executable code for determining the two-dimensional velocity field based on the flow measurement information. In some cases, the computer program product further includes computer-executable code for displaying the two-dimensional velocity field on an output device. In some cases, the output device includes a visual display subsystem. In some cases, the visual display subsystem includes a flat-panel device. In some cases, the computer program product further includes computer-executable code for transmitting the two-dimensional velocity field to an audio output device. In some cases, the acoustic camera system includes the non-transitory tangible computer readable medium.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method of measuring a two-dimensional velocity field for a large scale flow in a turbid environment with a field-deployable acoustic camera system, the method comprising:
    positioning the field-deployable acoustic camera system in the turbid environment, wherein the field-deployable acoustic camera system comprises an acoustic camera and a concentrator lens, the concentrator lens operating to reduce a spreading angle of the acoustic camera; and
    measuring the two-dimensional flow velocity field in the turbid environment with the field-deployable acoustic camera system.

2. The method of claim 1, wherein the field-deployable acoustic camera system measures the two-dimensional flow velocity field by analyzing native micro-bubbles present in the turbid environment.

3. The method of claim 1, wherein the turbid environment comprises a member selected from the group consisting of a riverine flow, an estuarine flow, a coastal flow, and a flow near a dredging operation.

4. The method of claim 1, wherein the concentrator lens operates to reduce the spreading angle of the acoustic camera to an angle having a value within a range that extends from 1° to 8°.

5. The method of claim 1, wherein the concentrator lens operates to reduce the spreading angle of the acoustic camera to 8°.

6. The method of claim 1, wherein the concentrator lens operates to reduce the spreading angle of the acoustic camera to 3°.

7. The method of claim 1, wherein the concentrator lens operates to reduce the spreading angle of the acoustic camera to 1°.

8. The method of claim 1, wherein the field-deployable acoustic camera system is configured to evaluate an insonified volume having a thickness value within a range that extends from 1 cm to 4 cm.

9. A field-deployable acoustic camera system for measuring a two-dimensional velocity field in a large scale flow in a turbid environment, the system comprising:
    an acoustic camera; and
    concentrator lens in operative association with the acoustic camera,
    wherein the concentrator lens operates to reduce a spreading angle of the acoustic camera.

10. The system of claim 9, wherein the concentrator lens operates to reduce the spreading angle of the acoustic camera to an angle having a value within a range that extends from 1° to 8°.

11. The system of claim 9, wherein the concentrator lens operates to reduce the spreading angle of the acoustic camera to 8°.

12. The system of claim 9, wherein the concentrator lens operates to reduce the spreading angle of the acoustic camera to 3°.

13. The system of claim 9, wherein the concentrator lens operates to reduce the spreading angle of the acoustic camera to 1°.

14. The system of claim 9, wherein the field-deployable acoustic camera system is configured to evaluate an insonified volume having a thickness value within a range that extends from 1 cm to 4 cm.

15. A computer program product for determining a two-dimensional velocity field in a large scale flow in a turbid environment, the computer program product embodied on a non-transitory tangible computer readable medium, comprising:
    computer-executable code for receiving flow measurement information from an acoustic camera system, the acoustic camera system comprising an acoustic camera and a concentrator lens, the concentrator lens operating to reducing a spreading angle of the acoustic camera; and
    computer-executable code for determining the two-dimensional velocity field based on the flow measurement information.

16. The computer program product of claim 15, further comprising computer-executable code for displaying the two-dimensional velocity field on an output device.

17. The computer program product of claim 16, wherein the output device comprises a visual display subsystem.

18. The computer program product of claim 17, wherein the visual display subsystem comprises a flat-panel device.

19. The computer program product of claim 15, further comprising computer-executable code for transmitting the two-dimensional velocity field to an audio output device.

20. The computer program product of claim 15, wherein the acoustic camera system comprises the non-transitory tangible computer readable medium.

* * * * *